(12) United States Patent
Okahara et al.

(10) Patent No.: US 7,705,580 B2
(45) Date of Patent: Apr. 27, 2010

(54) SYSTEM FOR SMOOTHING OUTPUT VOLTAGE OF POWER GENERATOR

(75) Inventors: Hideto Okahara, Kariya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 278 days.

(21) Appl. No.: 11/882,671

(22) Filed: Aug. 3, 2007

(65) Prior Publication Data
US 2008/0030184 A1 Feb. 7, 2008

(30) Foreign Application Priority Data
Aug. 7, 2006 (JP) ............................. 2006-214893

(51) Int. Cl.
G05F 1/00 (2006.01)
H04B 1/10 (2006.01)
(52) U.S. Cl. ...................................... 323/286; 327/554
(58) Field of Classification Search ................. 323/286, 323/244, 257; 327/336, 337, 552, 554, 557, 327/558, 559
See application file for complete search history.

(56) References Cited

U.S. PATENT DOCUMENTS 4,899,069 A * 2/1990 Nicollini ..................... 327/558
5,999,042 A * 12/1999 Hemdal et al. ............... 327/554
7,015,594 B2 * 3/2006 Asada ....................... 290/40 R
7,285,938 B2 * 10/2007 Aoyama ...................... 322/28
2006/0006845 A1 * 1/2006 Aoyama ...................... 322/22

FOREIGN PATENT DOCUMENTS

JP A 02-051398 2/1990

* cited by examiner

Primary Examiner—Jessica Han
Assistant Examiner—Emily Pham
(74) Attorney, Agent, or Firm—Oliff & Berridge, PLC

(57) ABSTRACT

In a system, an output voltage of a power generator is input to a filter circuit. The filter circuit includes a first capacitor having opposing first and second electrodes, a second capacitor having opposing third and fourth electrodes, a first switch electrically connected to be series with the third electrode of the second capacitor, and a second switch electrically connected to be series with the fourth electrode of the second capacitor. A series circuit of series-connected first switch, the second capacitor, and the second switch is electrically connected with the first capacitor in parallel thereto. A control circuit is electrically connected to the first and second switches of the filter circuit. The control unit is configured to control the first and second switches to be substantially simultaneously on and off to thereby cause the filter circuit to filter the frequency components from the output voltage.

7 Claims, 4 Drawing Sheets

SYSTEM FOR SMOOTHING OUTPUT VOLTAGE OF POWER GENERATOR

CROSS REFERENCE TO RELATED APPLICATION

This application is based on Japanese Patent Application No. 2006-214893 filed on Aug. 7, 2006. The descriptions of the Patent Application are all incorporated herein by reference.

BACKGROUND OF THE INVENTION

1. Field of the Invention

The present invention relates to power-generator control systems for smoothing an output voltage of a power generator.

2. Description of the Related Art

In an alternator installable in vehicles, when a rotor of the alternator rotates, a field winding wound around a core of the rotor creates magnetic fluxes when a field current is supplied thereto, and the created magnetic fluxes magnetize the core to provide field poles.

The rotation of the filed poles creates magnetic fluxes, and the created magnetic fluxes induce three-phase AC voltages in three-phase stator windings wound around a stator core that faces the rotor core. The three-phase AC voltages are rectified so that a DC voltage is generated as an output voltage from the alternator.

In such an alternator, one phase voltage is different in phase from another phase voltage, and therefore, rectification of three-phase AC voltages induced in the three-phase windings may cause ripple voltages to appear on an output voltage. Cycles of the ripple voltages therefore change depending on the number of revolutions of the alternator (rotor).

In controlling the output voltage of the alternator, it is important to eliminate the ripple voltages appearing on the output voltage of the alternator.

An example of such means for eliminating ripple voltages from an output voltage of an alternator is disclosed in Japanese Unexamined Patent Publication No. H02-51398.

The ripple-voltage eliminating means disclosed in the Japanese Unexamined Patent Publication is provided with a control circuit that controls a field current to be supplied to a field winding of a synchronous generator to thereby regulate a negatively fed-back output voltage of the synchronous generator to a constant value.

Specifically, the control circuit includes a filter. The filter consists of a differential amplifier, a resistor connected between a negative input terminal and an output terminal thereof, a plurality of capacitors, and a switch.

One electrode of each of the individual capacitors is electrically connected with the negative input terminal to which the output voltage of the synchronous generator is input, and the switch is electrically connected with the output terminal of the differential amplifier. The switch works to select any one of the other electrodes of the individual capacitors to be electrically connected with the output terminal of the differential amplifier.

With the configuration of the control circuit, change of a capacitor to be electrically connected with the output terminal of the differential amplifier allows a lagging phase and a leading phase in the feedback loop to be adjusted, thus effectively filtering out ripple voltages from the output voltage of the synchronous generator. This makes it possible to improve the voltage regulation characteristic of the control circuit.

In the structure of the control circuit, the switch is connected with only the other electrode of any one of the capacitors.

The control circuit is normally designed as an IC. In the control IC, the switch is normally composed of a semiconductor switching element(s), such as a transistor.

When the control IC is used under high-temperature environment as a part of a vehicle, a leakage current that flows across region(s) of the semiconductor switching element in which no current should be flowing may be not ignored. This causes the voltage regulation characteristic of the control circuit to deteriorate.

For example, in the control IC with the filter whose differential amplifier consists of a pair of current-mirror transistors, a leakage current may appear to flow from the switch connected with one of the capacitors to the semiconductor substrate of the control IC. The appearance of leakage current may cause a current flowing through one of the current-mirror transistors to be mismatched with one current flowing through the other of the current-mirror transistors. This may cause the ripple-voltage filtering characteristic of the control IC to deteriorate, so some of ripple voltages, which are supposed to be eliminated under no leakage currents appearing in the control IC, remain in the output voltage. This may cause the voltage regulation characteristic of the control circuit to become worse.

SUMMARY OF THE INVENTION

In view of the background, an object of at least one aspect of the present invention is to provide power-generation control systems for smoothing an output voltage of a power generator; these systems are adapted to improve the characteristic of filtering out ripple voltages appearing on an output voltage upon it being smoothed irrespectively of occurrence of leakage currents in at least part of the systems.

According to one aspect of the present invention, there is provided a system for smoothing an output voltage of a power generator. The output voltage contains frequency components. The system includes a filter circuit to which the output voltage is input. The filter circuit includes a first capacitor having opposing first and second electrodes, a second capacitor having opposing third and fourth electrodes, a first switch electrically connected to be series with the third electrode of the second capacitor, and a second switch electrically connected to be series with the fourth electrode of the second capacitor. The series-connected first switch, the second capacitor, and the second switch constitute a series circuit. The series circuit is electrically connected with the first capacitor in parallel thereto. The system includes a control circuit electrically connected to the first and second switches of the filter circuit and configured to control the first and second switches to be substantially simultaneously on and off to thereby cause the filter circuit to filter out the frequency components from the output voltage.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
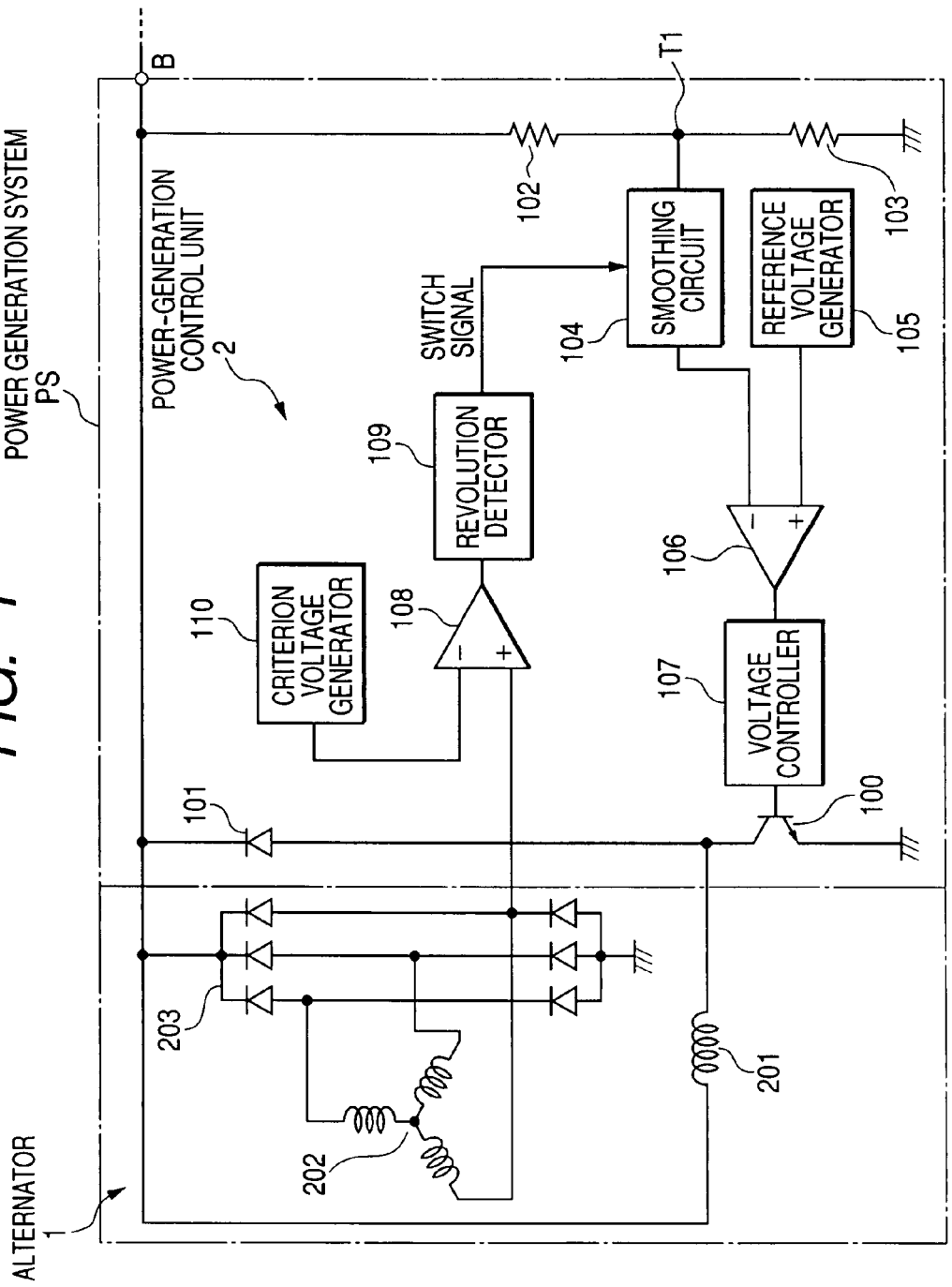
FIG. 1 is a circuit diagram schematically illustrating an example of the structure of a power-generation control system including an alternator and a power-generation control unit according to an embodiment of the present invention.

An embodiment of the present invention will be described hereinafter with reference to the accompanying drawings. In the drawings, identical reference characters are utilized to identify identical corresponding components.

Referring to FIG. 1, there is provided a power generation system PS according to an embodiment of the present invention; this power generation system PS is installed beforehand in a vehicle.

The power generation system PS includes an alternator 1 as an example of power generators, and a power-generation control unit 2 operative to regulate an output voltage of the alternator 1 to a target voltage of, for example, 14 V; this alternator 1 is installed beforehand in the vehicle.

The alternator 1 has a terminal B to which a positive terminal of a battery 3 and other electrical loads (not shown) are connected with the terminal B of the alternator 1. The terminal B of the alternator 1 serves as an output terminal thereof. Specifically, the power-generation control unit 2 is operative to control the voltage at the output terminal of the alternator 1 to be set to the target voltage.

In the embodiment, the positive terminal voltage of the battery 3 is 12V when the battery 3 is fully charged.

The alternator 1 is equipped with a field winding (exciting winding) 201 wound around a core of a rotor to create field poles (north and south poles) alternately arranged when energized. The rotor is coupled to a crankshaft of an engine through a belt to be rotatable therewith.

The alternator 1 is provided with three-phase stator windings 202 connected in, for example, star configuration and wound around a stator core that surrounds the rotor, and a rectifier 203 consisting of, for example, three pairs of positive (high-side) and negative (low-side) diodes connected in the form of a bridge. Specifically, the positive and negative diodes of each pair are connected in series at a connection point, and the connection points of the three-paired diodes are connected with lead wires of the three-phase stator windings 202, respectively.

The cathodes of the high-side diodes are commonly connected with the output terminal B of the alternator 1, and the anodes of the low-side diodes are commonly connected with a ground terminal of the alternator 1 serving as, for example, a signal common (signal ground) thereof. One end of the exciting winding 201 is connected with the cathodes of the high-side diodes.

In the alternator 1, when the field winding 201 is energized while the rotor rotates, the rotating field winding 201 creates magnetic fluxes. The created magnetic fluxes magnetize the stator core to provide the field poles.

The rotation of the filed poles creates magnetic fluxes, and the created magnetic fluxes induce a three-phase AC voltage in the three-phase stator windings 202. The rectifier 203 full-wave rectifies the induced three-phase AC voltage induced in the stator windings 202 to a direct current (DC) voltage. The full-wave rectified DC voltage is output through the output terminal B so that the output DC voltage is supplied to the battery 3 and the electrical loads.

The output voltage of the alternator 1 depends on the number of rotation of the rotor and the amount of the field current to be supplied to the field winding 201.

The power-generation control unit 2 is provided with a drive transistor 100 as an example of drive switch elements, a flywheel diode 101, a first resistor 102, a second resistor 103, a smoothing circuit 104, a reference voltage generator 105, a first voltage comparator 106, a second voltage comparator 108, a voltage controller 107, a revolution detector 109, and a criterion voltage generator 110. The drive transistor 100, the flywheel diode 101, the first and second resistors 102 and 103, the smoothing circuit 104, the first voltage comparator 106, and the voltage controller 107 serve as a voltage regulator VR.

As the drive transistor 100, an NPN transistor is used.

The base of the drive transistor 100 is electrically connected with an output terminal of the voltage controller 107, and the collector thereof is connected with the output terminal B of the alternator 1 through the flywheel diode 101. The emitter of the drive transistor 100 is connected with the ground terminal of the alternator 1. The collector of the drive transistor 100 is also connected with the other end of the field winding 201.

The flywheel diode 101 is connected at its cathode to the output terminal B of the alternator 1 and at its anode to the collector of the drive transistor 100 to be parallel to the field winding 201.

Specifically, when the drive transistor 100 becomes on, a field current flows through the filed winding 201 based on the voltage at the output terminal B of the alternator 1. In contrast, when the drive transistor 100 becomes off, the field current continues to flow through the flywheel diode 101.

One end of the first resistor 102 is electrically connected with the output terminal B of the alternator 1. The other end of the first transistor 102 is electrically connected at a tap T1 with one end of the second resistor 103, and the other end of the second resistor 103 is electrically connected with the ground terminal of the alternator 1.

Specifically, the first and second resistors 102 and 103 serve as a voltage divider working to divide the voltage at the output terminal of the alternator 1 depending on the ratio of the first and second resistors 102 and 103 to thereby generate, at the tap T1, a monitor voltage Vm for monitoring the voltage at the output terminal B of the alternator 1.

For example, when the first and second resistors 102 and 103 respectively have resistances R1 and R2, the monitor voltage Vm is expressed by the following equation:

$$Vm = \frac{R2 \cdot V_B}{R1 + R2}$$

Where $V_B$ represents the voltage at the output terminal B of the alternator 1.

The tap T1 is electrically connected with an input terminal IN (see FIG. 2) of the smoothing circuit 104. An output terminal of the smoothing circuit 104 is electrically connected with a negative input terminal (−) of the first voltage comparator 106.

The electrical structure allows the monitor voltage Vm at the tap T1 to be input to the input terminal IN of the smoothing circuit 104.

The smoothing circuit 104 is operative to smooth the monitor voltage Vm input to its input terminal IN to output the smoothed monitor voltage Vm to the negative input terminal of the first voltage comparator 106.

A positive input terminal (+) of the first voltage comparator 106 is electrically connected with the reference voltage generator 105.

The reference voltage generator 105 is operative to generate a reference voltage Vr that is substantially equivalent to the target voltage. Specifically, the reference voltage generator 105 is operative to generate, based on, for example, a constant voltage, the reference voltage Vr by multiplying the target voltage by the ratio "R2/(R1+R2)" of the resistances R1 and R2 of the respective first and second resistors 102 and 103. The constant voltage can be generated by a power source circuit. The power source circuit can be installed in the power generation system PS and operative to generate the constant voltage based on the voltage at the output terminal B of the alternator 1. As the power source circuit, the battery 3 or another battery installed in the vehicle can be used to supply the constant voltage to the reference voltage generator 105.

The reference voltage generator 105 is operative to output the generated reference voltage Vr to the positive terminal of the first voltage comparator 106.

An output terminal of the first voltage comparator 106 is electrically connected with an input terminal of the voltage controller 107.

The first voltage generator 106 is operative to output a control signal with a low level when it is determined that the smoothed monitor voltage Vm is higher than the reference voltage Vr based on the comparison result.

In contrast, the first voltage generator 106 is operative to output the control signal with a high level when it is determined that the smoothed monitor voltage Vm is lower than the reference voltage Vr based on the comparison result.

The voltage controller 107 is operative to supply a drive signal to the base of the drive transistor 100 to turn it on and off based on a duty (duty cycle) determined by the level of the control signal.

Specifically, when the level of the control signal is low, the voltage controller 107 supplies the drive signal to the base of the drive transistor 100 to turn it on and off based on the duty cycle of 0% or a predetermined % close thereto.

In contrast, when the level of the control signal is high, the voltage controller 107 supplies the drive signal to the base of the drive transistor 100 to turn it on and off based on the duty cycle of 100% or a predetermined % close thereto.

The duty cycle of the drive transistor 100 means the ratio of the on duration of the drive transistor 100 to each switching (on and off) period.

For example, the duty cycle of 100% of the drive transistor 100 means that the ratio of the on duration of the of the drive transistor 100 to each switching (on and off) period is set to 100%. In contrast, the duty cycle of 0% of the drive transistor 100 means that the ratio of the on duration of the of the drive transistor 100 to each switching (on and off) period is set to 0%.

Specifically, in the embodiment, when the preset reference voltage Vr is greater than the monitor voltage Vm, the voltage controller 107 supplies the drive signal to the base of the drive transistor 100 to turn it on and off based on a duty cycle of 100% or thereabout. This allows the duration of the field current flowing through the field winding 201 to increase, making it possible to increase the magnetizing force in the stator core. This allows the magnitude of the three-phase voltage induced in the thee-phase stator windings 202 to increase.

The increase in the three-phase voltage induced in the three-phase stator windings 202 allows the output voltage of the alternator 1 at the output terminal B to increase, so that the monitor voltage depending on the voltage at the output terminal B of the alternator 1 increases.

As a result, when the monitor voltage Vm approximately reaches the preset reference voltage Vr, the voltage controller 107 supplies the drive signal to the base of the drive transistor 100 to turn it on and off based on a duty cycle of 0% or thereabout, reducing the field current to be supplied to the filed winding 201.

The decrease in the field current reduces the output voltage of the alternator 1, so that the monitor voltage Vm depending on the output voltage of the alternator 1 decreases. This causes the drive signal to the base of the drive transistor 100 to turn it on and off based on a duty cycle of 100% or thereabout, increases the filed current to be supplied to the filed winding 201.

The increase in the field current increases the voltage at the output voltage of the alternator 1 with the increase in the monitor voltage Vm depending on the output voltage of the alternator 1.

These field-current control operations based on control of the duty cycle of the drive transistor 100 allow the output voltage of the alternator 1 to be regulated to the preset target voltage. The regulated voltage at the output terminal B of the alternator 1 is supplied to the battery 3 and the other electrical loads.

On the other hand, the second voltage comparator 108 has a negative input terminal (−), a positive input terminal (+), and an output terminal. To the negative input terminal (−), an output terminal of the criterion voltage generator 110 is electrically connected.

The output terminal of the second voltage comparator 108 is electrically connected with an input terminal of the revolution detector 109.

The criterion voltage generator 110 is operative to generate a criterion voltage for determination of revolutions of the alternator 1 based on, for example, a voltage supplied from the power source circuit.

One phase winding of the three-phase stator windings 202 is electrically connected with the positive terminal of the second voltage comparator 108. This allows one phase voltage of the three-phase stator windings 202 to be input to the positive terminal of the second voltage comparator 108.

The second voltage comparator 108 is operative to compare the one phase voltage with the criteria voltage.

The second voltage comparator 108 is operative to output, to the input terminal of the revolution detector 109, a revolution detecting signal with a low level when it is determined that the one phase voltage is equal to or greater than the criteria voltage based on the comparison result.

In contrast, the second voltage comparator 108 is operative to output, to the input terminal of the revolution detector 109, the revolution detecting signal with a high level when it is determined that the one phase voltage is lower than the criteria voltage based on the comparison result.

The revolution detector 109 is operative to detect the number of revolutions, such as the RPM, of the alternator 1 based on the level of the revolution detecting signal.

Specifically, when the RPM of the alternator 1 is equal to or higher than a predetermined RPM, the one phase voltage is equal to or greater than the criteria voltage, so that the second voltage comparator 108 is operative to output, to the revolution detector 109, the revolution detecting signal with the low level.

This allows the revolution detector 109 to output a switch signal with a low level to the smoothing circuit 104.

In contrast, when the RPM of the alternator 1 is lower than the predetermined RPM, the one phase voltage is lower than the criteria voltage, so that the second voltage comparator 108 is operative to output, to the revolution detector 109, the revolution detecting signal with the high level.

This allows the revolution detector 109 to output the switch signal with a high level to the smoothing circuit 104.

In other words, the level of the switch signal to be output from the revolution detector 109 to the smoothing circuit 104 changes depending on whether the RPM of the alternator 1 is equal to or higher than the predetermined RPM.

Figure 2:
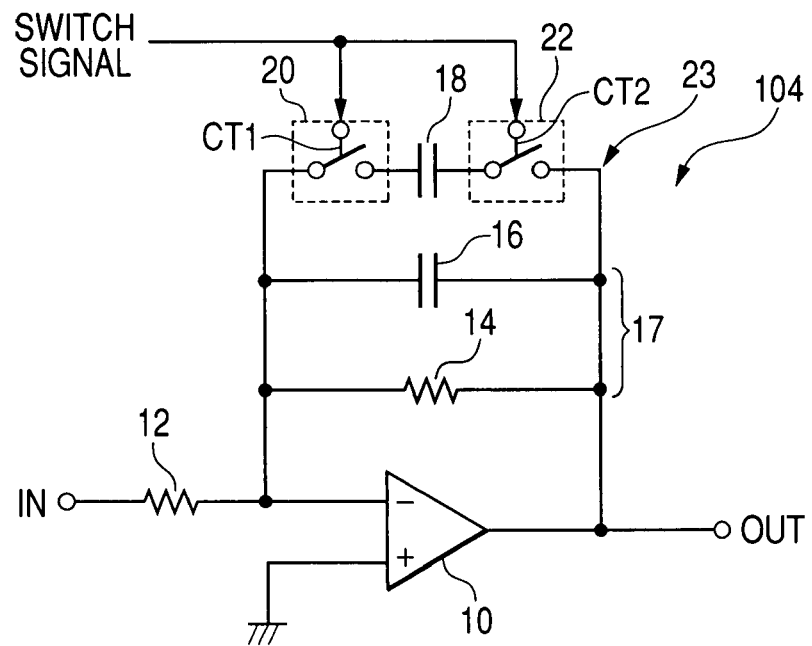
FIG. 2 is a circuit diagram schematically illustrating an example of the structure of a smoothing circuit illustrated in FIG. 1.

FIG. 2 schematically illustrates an example of the circuit structure of the smoothing circuit 104.

Referring to FIG. 2, the smoothing circuit 104 is provided with a differential amplifier 10, a third resistor 12, a fourth resistor (feedback resistor) 14, a first capacitor (feedback capacitor) 16, a second capacitor (feedback capacitor) 18, a first switch 20, and a second switch 22.

At least the smoothing circuit 104 is designed as an IC, and at least each of the first and second switches 20 and 22 is composed of at least one semiconductor switching element, such as a bipolar transistor or a MOS transistor. The first and second switches 20 and 22 are designed to cause substantially the same amount of leakage current to flow during their being off.

The differential amplifier 10 has a negative input terminal (−), a positive input terminal (+), and an output terminal. One end of the third resistor 12 is electrically connected with the input terminal IN of the smoothing circuit 104, and the other end thereof is electrically connected with the negative input terminal of the differential amplifier 10. This allows the monitor voltage Vm at the tap T1 to be input to the negative input terminal of the differential amplifier 10.

The positive input terminal of the differential amplifier 10 is electrically connected with the ground terminal of the alternator 1.

The fourth resistor 14 is electrically connected between the negative input terminal and the output terminal of the differential amplifier 10. The first capacitor 16 has opposing electrodes, one of which is electrically connected with the negative input terminal of the differential amplifier 10, and the other of which is electrically connected with the output terminal of the differential amplifier 10.

Specifically, the fourth resistor 14 and the first capacitor 16 constitute a first parallel feedback circuit 17 electrically connected between the negative input terminal and the output terminal of the differential amplifier 10.

The first switch 20, the second capacitor 18, and the second switch 22 are electrically series-connected with each other in this order to constitute a series circuit. The series circuit is electrically connected between the negative input terminal and the output terminal of the differential amplifier 10 in parallel to the parallel circuit 17. The series circuit will be therefore referred to as "a second parallel feedback circuit 23" hereinafter.

The first and second switches 20 and 22 have control terminals CT1 and CT2, respectively. The control terminals CT1 and CT2 of the first and second switches 20 and 22 are electrically connected with an output terminal of the revolution detector 109.

Each of the first and second switches 20 and 22 is configured to be turned off when the switch signal with the high level is input to a corresponding one of the control terminals CT1 and CT2.

The off state of each of the first and second switches 20 and 22 allows the first parallel feedback circuit 17 to be only connected between the negative input terminal and the output terminal of the differential amplifier 10.

Assuming that a capacitance of the first capacitor 16 is represented as C1, and resistances of the third and fourth resistors 14 and 16 are respectively represented as R3 and R4, a first time constant $\tau 1$ of the smoothing circuit 104 upon the first and second switches 20 and 22 being off is given by the following equation:

$$\tau 1 = R3 C1 \quad [1]$$

In addition, a gain A1 of the smoothing circuit 104 upon the first and second switches 20 and 22 being off is given by the following equation:

$$A1 = -R3 \frac{1}{R4 + 2\pi f C1} \quad [2]$$

where "f" represents a frequency of the monitor output voltage Vm at the tap T1.

In contrast, each of the first and second switches 20 and 22 is configured to be turned on when the switch signal with the low level is input to a corresponding one of the control terminals CT1 and CT2.

The on state of each of the first and second switches 20 and 22 allows the first and second parallel feedback circuits 17 and 23 to be connected between the negative input terminal and the output terminal of the differential amplifier 10.

Assuming that a capacitance of the second capacitor 18 is represented as C2, a second time constant $\tau 2$ of the smoothing circuit 104 upon the first and second switches 20 and 22 being on is given by the following equation:

$$\tau 2 = R4(C1 + C2) \quad [3]$$

In addition, a gain A2 of the smoothing circuit 104 upon the first and second switches 20 and 22 being on is given by the following equation:

$$A2 = -R3 \frac{1}{R4 + 2\pi f(C1 + C2)} \quad [4]$$

As shown in the equations [2] and [4], the higher the frequency of the monitor voltage Vm is, the lower the gains A1 and A2 are. This makes it possible to eliminate high-frequency components contained in the monitor voltage Vm; these high-frequency components are higher than a corresponding cut-off frequency $2\pi f C1$ or $2\pi f(C1+C2)$.

Specifically, when the monitor voltage Vm is input to the negative input terminal of the differential amplifier 10 upon the first and second switches 20 and 22 being off, the monitor voltage Vm is smoothed by the smoothed circuit 104 based on the first time constant $\tau 1$ so that ripple voltages whose frequencies are higher than the cut-off frequency $2\pi f C1$ can be effectively eliminated from the monitor voltage Vm.

In contrast, when the monitor voltage Vm is input to the negative input terminal of the differential amplifier 10 upon the first and second switches 20 and 22 being on, the monitor voltage Vm is smoothed by the smoothed circuit 104 based on the second time constant τ2 so that ripple voltages whose frequencies are higher than the cut-off frequency 2πf(C1+C2) can be effectively eliminated from the monitor voltage Vm.

As described above, in the embodiment, it is possible to effectively eliminate ripple voltages from the output voltage (monitor voltage Vm) of the alternator 1 even if frequencies (cycles) of the ripple voltages are changed with the change in the RPM of the alternator 1.

From a differential viewpoint, the speed of the monitor voltage Vm being smoothed by the smoothing circuit 104 upon the first and second switches 20 and 22 being on is slower than that of the monitor voltage Vm being smoothed by the smoothing circuit 104 upon the first and second switches 20 and 22 being off.

As described above, in the smoothing circuit 104 according to the embodiment, simultaneous on and off controls of the first and second switches 20 and 22 electrically connected with both opposing electrodes of the second capacitor 18 allow selection of any one of the first and second time constants τ1 and τ2.

Thus, when the first and second switches 20 and 22 are each made up of at least one semiconductor switching element, such as a bipolar transistor or a MOS transistor, mounted on the smoothing IC 104, in the event of occurrence of a leakage current in each of the first and second switches 20 and 22, it is possible to substantially match the leakage current flowing through the first switch 20 with the leakage current flowing through the second switch 22. This can prevent the ripple-voltage eliminating characteristic of the smoothing circuit 104 from deteriorating.

Figure 3:
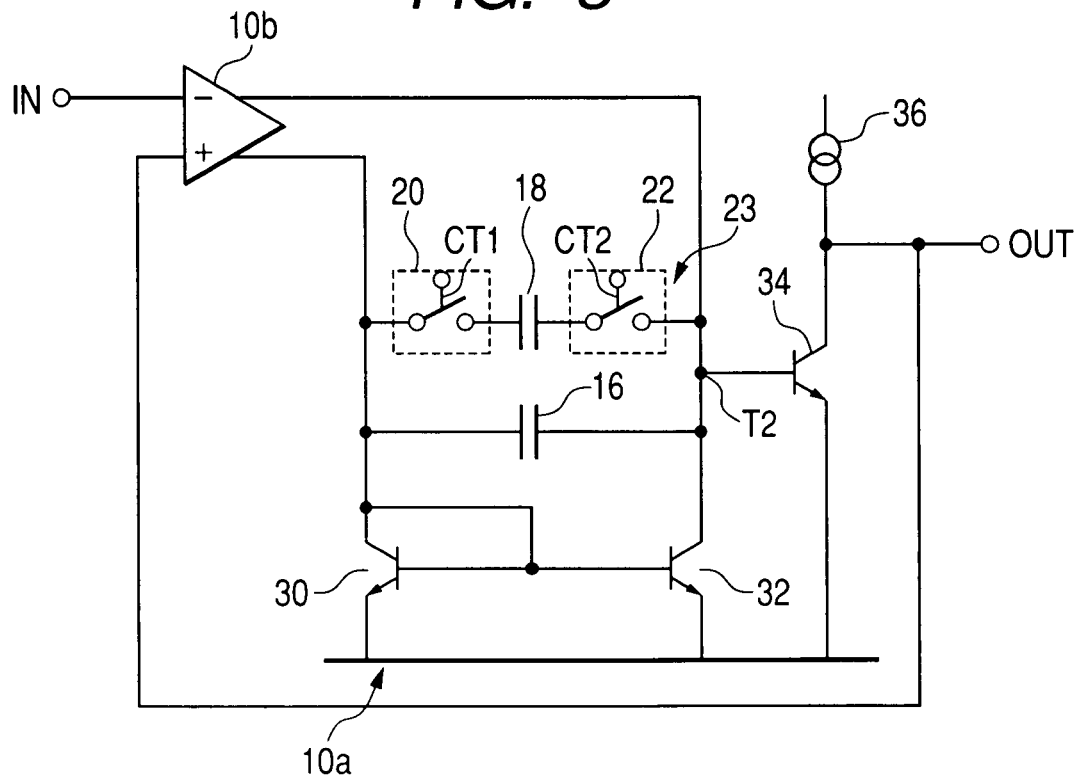
FIG. 3 is a circuit diagram schematically illustrating an example of the specific structure of a modification of a smoothing circuit illustrated in FIG. 2 in order to clearly show the impact of leakage currents thereon.

FIG. 3 schematically illustrates an example of the specific structure of the smoothing circuit 104 deformed to clearly show the impact of leakage currents thereon.

In the deformed smoothing circuit 104, a differential output stage 10a is separated from the differential amplifier 10 illustrated in FIG. 2 so that the differential output stage 10a and an amplifying stage 10b of the differential amplifier 10 are individually illustrated in FIG. 3.

Specifically, the differential output stage 10a consists of a pair of current-mirror NPN transistors 30 and 32 each having the same characteristics, a constant current source 36, and an NPN transistor 34, which serve as an output buffer thereof.

The bases of the NPN transistors 30 and 32 are electrically connected together, and the emitters thereof are also electrically connected together. The common base of the NPN transistors 30 and 32 is electrically connected with the collector of, for example, the first transistor 30.

The first parallel circuit 17 and the second parallel circuit 23 are electrically connected in parallel to each other between the collectors of the NPN transistors 30 and 32. Note that, in FIG. 3, illustration of the third and forth resistors 12 and 14 is omitted for the sake of simplification.

The emitters of the NPN transistors 30 and 32, and the emitter of the NPN transistor 34 are electrically connected with, for example, the ground terminal of the alternator 1. The base of the NPN transistor 34 is electrically connected at a tap T2 with the collector of the NPN transistor 32. The collector of the NPN transistor 34 is electrically connected with an output of the constant current source 36. The collector of the NPN transistor 34 is drawn to serve as the output terminal OUT Of the deformed smoothing circuit 104.

The output terminal OUT of the deformed smoothing circuit 104 is electrically connected with the positive input terminal of the deformed smoothing circuit 104, and the positive input terminal thereof is electrically connected with the collector of the NPN transistor 30. The negative input terminal of the deformed smoothing circuit 104 is electrically connected with the collector of the NPN transistor 32.

The constant current source 36 is operative to supply an operating current to the collector of the NPN transistor 34 so as to bias it. The NPN transistor 34 is operative to amplify a voltage at the tap T2 to output the amplified voltage as a collector voltage thereof.

Specifically, in the configuration of the deformed smoothing circuit 104, a differential voltage between the monitor voltage Vm input to the negative input terminal and an output voltage input to the positive input terminal of the deformed smoothing circuit 104 is amplified (smoothed) by the amplifying stage 10b with the use of the gain A1 or A2.

The amplified differential voltage appears at the tap T2. The amplified differential voltage at the tap T2 is applied to the gate of the NPN transistor 34 so that the amplified differential voltage is derived from the NPN transistor (grounded-emitter amplifier) 34 as a collector voltage thereof. The collector voltage is output from the output terminal OUT of the deformed smoothing circuit 104 as the smoothed monitor voltage Vm.

In the configuration of the deformed smoothing circuit 104, it is assumed that the first switch 20 is removed from the structure of the smoothing circuit 104, the one electrode of the second capacitor 18 is directly connected with the collector of the NPN transistor 30, and the other electrode of the second capacitor 18 is electrically connected with the collector of the NPN transistor 32 via the second switch 22.

As described above, at least the smoothing circuit 104 is designed as an IC so that the second switch 22 is composed of a bipolar transistor or a MOS transistor.

Thus, the second switch 22 in off state allows a leakage current to flow therethrough to a semiconductor substrate of the smoothing IC 104.

The current mirror configuration of the NPN transistors 30 and 32 normally allows a collector current I1 flowing through the NPN transistor 30 to be identical to a collector current I2 flowing through the NPN transistor 32.

However, the flow of the leakage current through the second switch 22 may cause the amount of the collector current I2 to decrease as compared with the amount of the collector current I1.

The unbalance between the collector current I1 and the collector current I2 may cause the ripple-voltage filtering characteristic of the smoothing circuit (smoothing IC) 104 to deteriorate.

In contrast, in the configuration of the smoothing circuit 104 according to the embodiment, as illustrated in FIGS. 2 and 3, the first and second switches 20 and 22 are provided to be electrically connected with the respective electrodes of the second capacitor 18.

In the configuration of the smoothing circuit 104 according to the embodiment, if a leakage current flows through the first and second switches 20 and 22 to the semiconductor substrate during their being in off state, the flows of the leakage currents through the respective first and second switches 20 and 22 may cause the amounts of the collector currents I1 and I2 to be equally reduced.

This can substantially keep the amount of the collector current I1 and that of the collector current I2 balanced, making it possible to prevent the ripple-voltage filtering characteristic of the smoothing circuit (smoothing IC) 104 from deteriorating.

In the embodiment, it is necessary to design each of the first and second switches 20 and 22 so that it allows the substantially same amount of leakage current to flow during its being off.

Figure 4:
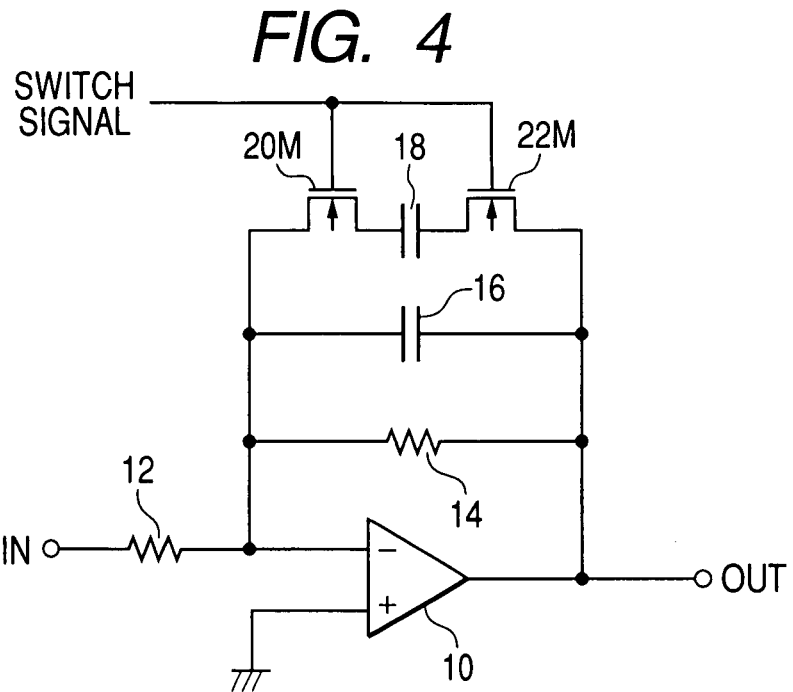
FIG. 4 is a circuit diagram schematically illustrating a specific example of the structure of a smoothing circuit using first and second P-channel MOS FETs as first and second switches illustrated in FIG. 2.

FIG. 4 schematically illustrates a specific example of the structure of the smoothing circuit 104 using first and second P-channel MOS FETs 20M and 22M as the first and second switches.

In a smoothing circuit 104A according to the specific example of the smoothing circuit 104, the first P-channel MOSFET 20M is provided to be electrically connected at its one of the source and drain with one of the electrodes of the second capacitor 18. In addition, the other of the source and drain of the first P-channel MOSFET 20M is electrically connected with the negative input terminal of the differential amplifier 10.

Similarly, the second P-channel MOSFET 22M is provided to be electrically connected at its one of the source and drain with the other of the electrodes of the second capacitor 18. In addition, the other of the source and drain of the second P-channel MOSFET 22M is electrically connected with the output terminal of the differential amplifier 10.

The gate of each of the first and second P-channel MOSFETs 20M and 22M is electrically connected with the output terminal of the revolution detector 109.

As described in detail hereinafter, the first and second P-channel MOSFETs 20M and 22M are commonly formed in a same island (a same well) in the semiconductor substrate of the smoothing IC 104A; this same island is surrounded by trench isolations). This allows the substantially same amount of leakage current to flow through each of the first and second P-channel MOSFETs 20M and 22M during its being off.

Figure 5:
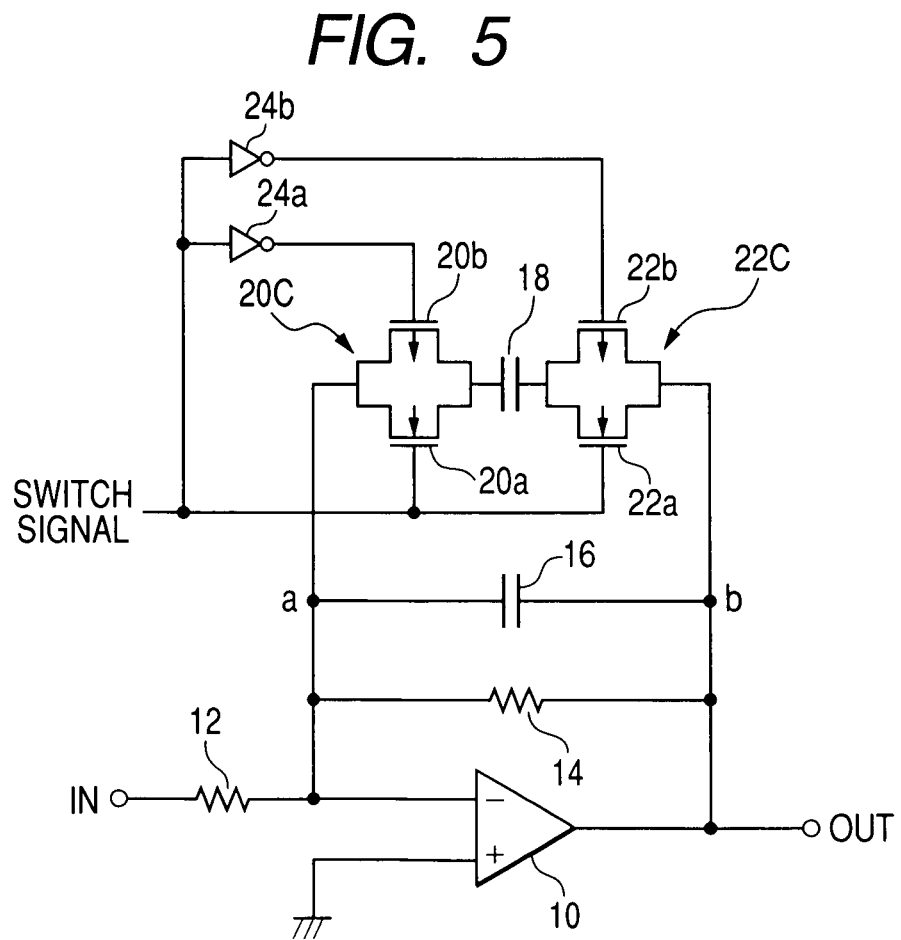
FIG. 5 is a circuit diagram schematically illustrates another specific example of the structure of the smoothing circuit using first and second CMOS switches as the first and second switches.

FIG. 5 schematically illustrates another specific example of the structure of the smoothing circuit 104 using first and second CMOS switches 20C and 22C as the first and second switches.

In a smoothing circuit 104B according to another specific example of the smoothing circuit 104, the first and second CMOSFETs (CMOS switches) 20C and 22C are provided to be electrically connected with the respective electrodes of the second capacitor 18.

The first CMOS switch 20C consists of a P-channel MOSFET 20a and an N-channel MOSFET 20b whose source and drain are electrically connected commonly with those of the P-channel MOSFET 20a. Similarly, the second CMOS switch 22C consists of a P-channel MOSFET 22a and an N-channel MOSFET 22b whose source and drain are electrically connected commonly with those of the P-channel MOSFET 22a.

One of the commonly connected source and drain of the first CMOS switch 20C is electrically connected with one of the electrodes of the second capacitor 18, and the other of the commonly connected source and drain of the first CMOS switch 20C is electrically connected with the negative input terminal of the differential amplifier 10.

Similarly, one of the commonly connected source and drain of the second CMOS switch 22C is electrically connected with the other of the electrodes of the second capacitor 18, and the other of the commonly connected source and drain of the second CMOS switch 22C is electrically connected with the output terminal of the differential amplifier 10.

The gate of each of the P-channel MOSFETs 20a and 22a of a corresponding one of the first and second CMOS switches 20C and 22C is electrically connected with the output terminal of the revolution detector 109.

In addition, the gate of the N-channel MOSFET 20b of the first CMOS switch 20C is electrically connected with an output terminal of an inverter 24a. The gate of the N-channel MOSFET 22b of the second CMOS switch 22C is electrically connected with an output terminal of an inverter 24b. An input terminal of each of the inverters 24a and 24b is electrically connected with the output terminal of the revolution detector 109.

In the configuration of the smoothing circuit 104B, when the switch signal with the high level is input to the gate of each of the P-channel MOSFETs 20a and 22a, the P-channel MOSFETs 20a and 22a are turned off. At that time, to the gate of each of the N-channel MOSFETs 20b and 22b, the switch signal with the inverted low level is input, the N-channel MOSFETs 20b and 22b are also turned off.

The off state of each of the first and second CMOS switches 20C and 22C allows the first parallel feedback circuit 17 to be only connected between the negative input terminal and the output terminal of the differential amplifier 10.

In contrast, when the switch signal with the low level is input to the gate of each of the P-channel MOSFETs 20a and 22a, the P-channel MOSFETs 20a and 22a are turned on. At that time, to the gate of each of the N-channel MOSFETs 20b and 22b, the switch signal with the inverted high level is input, the N-channel MOSFETs 20b and 22b are also turned on.

The on state of each of the first and second CMOS switches 20C and 22C allows the first and second parallel feedback circuits 17 and 23 to be connected between the negative input terminal and the output terminal of the differential amplifier 10.

As described above, when a P-channel MOSFET or an N-channel MOSFET is used as each of the first and second switches 20M and 22M (see FIG. 4), a voltage equal to or greater than a threshold voltage VT of the P-channel MOSFET or N-channel MOSFET is necessarily applied to the gate thereof. This may result in that:

an absolute maximum of the range of the monitor voltage Vm to be input to the source or drain of the first switch 20M is limited to be sufficiently lower than an absolute value of the gate voltage; and an absolute maximum of the range of the output of the differential amplifier 10 to be input to the source or drain of the second switch 22M is limited to be sufficiently lower than the absolute value of the gate voltage.

In contrast, the CMOS switches 20C and 22C each consisting of a P-channel MOSFET and an N-channel MOSFET used as the first and second switches 20 and 22 allow their on-resistance to be stable independently of the gate and/or drain voltages thereof. Thus, the range of the monitor voltage Vm to be input to the common source or common drain of the first CMOS switch 20C can be extended. Similarly, the range of the output of the differential amplifier 10 to be input to the common source or common drain of the second CMOS switch 22C can be extended.

Figure 6:
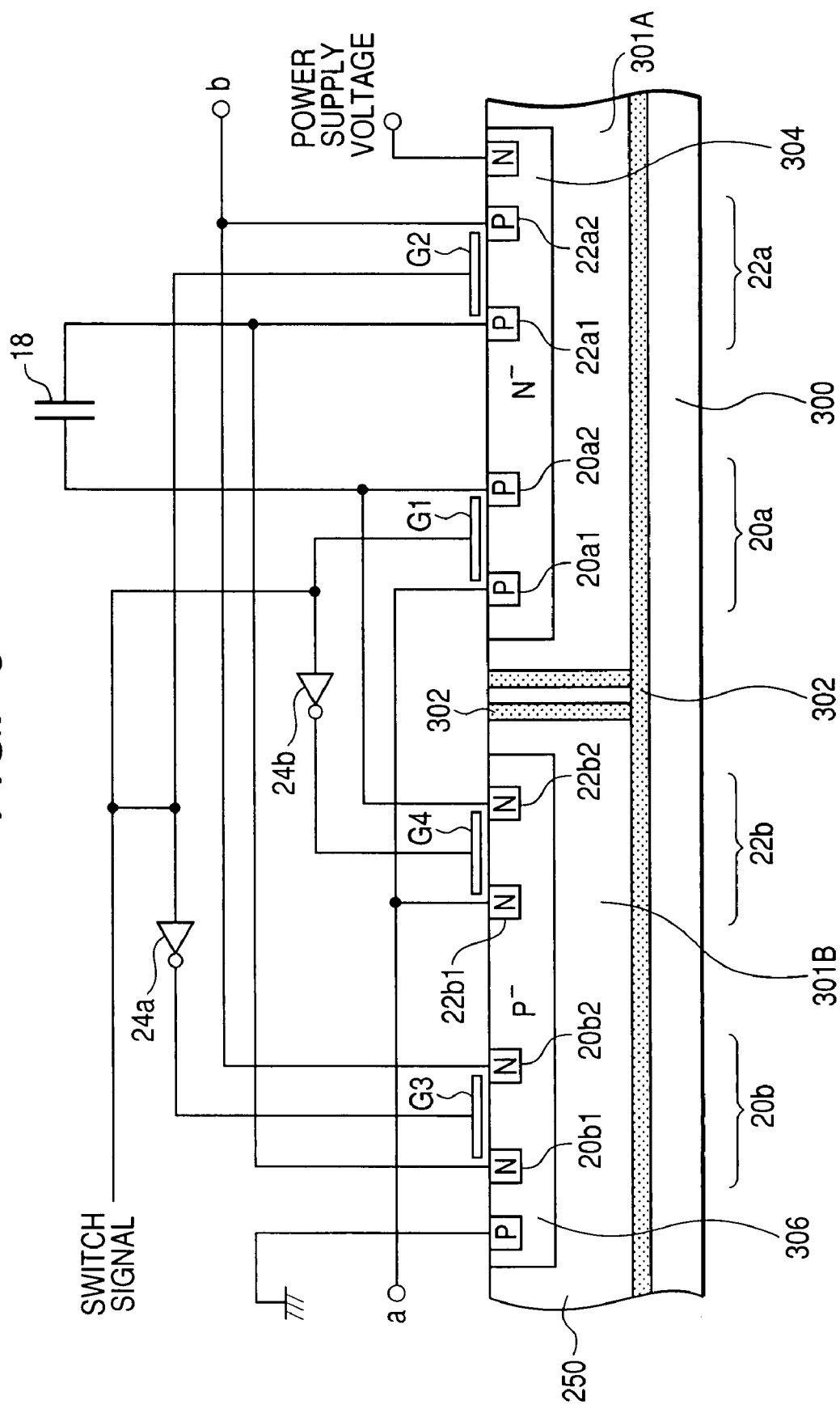
FIG. 6 is a view schematically illustrating an example of the configuration of a smoothing IC including the first and second CMOS switches formed on a common semiconductor substrate.

FIG. 6 schematically illustrates an example of the configuration of the smoothing IC 104B including the first and second CMOS switches 20C and 22C formed on a common semiconductor substrate 250. Note that, in FIG. 6, illustration of third and fourth resistors 12 and 14, and the first capacitor 16 are omitted for the sake of simplification. In addition, illustration of specific structures of the capacitor 18, and the inverters 24a and 24b formed on the common semiconductor substrate 250 are also omitted for the same of simplification.

Referring to FIG. 6, an island 301A is so formed in the common semiconductor substrate 250 from one surface thereof at a predetermined depth as to be surrounded by a plurality of trench isolations (trench isolation layers) 302. An N-well 304 is formed in the island 301A from the one surface of the substrate 250 at a predetermined depth.

P-type semiconductor regions 20a1 and 20a2 of the P-channel MOSFET 20a and P-type semiconductor regions 22a1 and 22a2 of the P-channel MOSFET 22a are commonly formed in the N-well 304 of the semiconductor substrate 250 so that:

the P-type semiconductor regions 20a1 and 20a2 are spaced at a predetermined interval to provide a channel therebetween; and the P-type semiconductor regions 22a1 and 22a2 are spaced at a predetermined interval to provide a channel therebetween.

An N-type semiconductor region is formed in the N-well 304 to which a power supply voltage is configured to be applied.

A gate electrode G1 is formed over the channel between the P-type semiconductor regions 20a1 and 20a2, and a gate electrode G2 is formed over the channel between the P-type semiconductor regions 22a1 and 22a2.

As well as the P-channel MOSFETs 20a and 22a, an island 301B is so formed in the common semiconductor substrate 250 from one surface thereof at a predetermined depth as to be surrounded by a plurality of trench isolations (trench isolation layers) 302. An P-well 306 is formed in the island 301B from the one surface of the substrate 250 at a predetermined depth.

N-type semiconductor regions 20b1 and 20b2 of the N-channel MOSFET 20b and N-type semiconductor regions 22b1 and 22b2 of the N-channel MOSFET 22b are commonly formed in the P-well 306 of the semiconductor substrate 250 so that:

the N-type semiconductor regions 20b1 and 20b2 are spaced at a predetermined interval to provide a channel therebetween; and the N-type semiconductor regions 22b2 and 22b2 are spaced at a predetermined interval to provide a channel therebetween.

A P-type semiconductor region is formed in the P-well 306 to which a ground terminal is electrically connected.

A gate electrode G3 is formed over the channel between the N-type semiconductor regions 20b1 and 20b2, and a gate electrode G4 is formed over the channel between the N-type semiconductor regions 22b1 and 22b2.

The output terminal of the inverter 24a is electrically connected with the gate electrode G3, and the input terminal of the inverter 24a and the gate electrode G2 are commonly electrically connected with the output terminal of the revolution detector 109.

Similarly, the output terminal of the inverter 24b is electrically connected with the gate electrode G4, and the input terminal of the inverter 24b and the gate electrode G1 are commonly electrically connected with the output terminal of the revolution detector 109.

The N-type semiconductor region 22b1 and the P-type semiconductor region 20a1 are commonly electrically connected, as the common drain or source, with the negative input terminal of the differential amplifier 10 (see tap a in FIGS. 5 and 6). Similarly, the N-type semiconductor region 20b2 and the P-type semiconductor region 22a2 are commonly electrically connected, as the common drain or source, with the output terminal of the differential amplifier 10 (see tap b in FIGS. 5 and 6).

In the configuration of the smoothing IC 104B, the P-channel MOSFETs 20a and 22a of the respective first and second CMOS switches 20C and 22C are formed in the common island 301A surrounded by the trench isolations 302, and more specifically, formed in the common P-well 304.

This allows an amount of leakage current flowing through the P-channel MOSFET 20a of the first CMOS switch 20C to be substantially identical to that of leakage current flowing through the P-channel MOSFET 22a of the second CMOS switch 22C.

Similarly, the N-channel MOSFETs 20b and 22b of the respective first and second CMOS switches 20C and 22C are formed in the common island 301B surrounded by the trench isolations 302, and more specifically, formed in the common N-well 306.

This allows an amount of leakage current flowing through the N-channel MOSFET 20b of the first CMOS switch 20C to be substantially identical to that of leakage current flowing through the P-channel MOSFET 22b of the second CMOS switch 22C.

As described above, according to the embodiment, if a leakage current flows through the first and second switches 20 and 22 respectively connected with both sides of the second capacitor 18, it is possible to achieve balance between current flow at one electrode side of the second capacitor 18 and that at the other electrode side thereof.

This can prevent the ripple-voltage filtering characteristics of the smoothing circuit 104 from deteriorating even if a leakage current flows through the first and second switches 20 and 22 to the semiconductor substrate during their being in off state. This makes it possible to improve the voltage regulation characteristic of the power generation system PS.

In particular, when the first and second switches 20 and 22 are each made up with at least one semiconductor switching element, it is possible to achieve balance between current flow at one electrode side of the second capacitor 18 and that at the other electrode side thereof even if a leakage current flows through the first and second switches (20M, 20C) and (22M, 22C) to the semiconductor substrate during their being in off state.

In addition, in the specific example of the embodiment, voltage-driven MOSFETs, such as P-channel or N-channel MOSFETs 20M and 22M, can be used as the first and second switches 20 and 22.

In this configuration, change of the voltage level of the select signal to be applied to the gate of each of the voltage driven MOSFETs 20 and 22 can prevent a current from flowing through the MOSFETs 20 and 22, making it possible to improve the voltage regulation characteristic of the power generation system PS.

With the first and second CMOS switches 20C and 22C used as the first and second switches 20 and 22 according to another specific example of the embodiment, the range of the monitor voltage Vm to be input to the common source or common drain of the first CMOS switch 20C can be extended, and the range of the output of the differential amplifier 10 to be input to the common source or common drain of the second CMOS switch 22C can be extended.

In another specific example of the embodiment, the P-channel MOSFETs 20a and 22a of the respective first and second CMOS switches 20C and 22C are formed in the common island 301A surrounded by the trench isolations 302. This can substantially match physical characteristics, such as electric potential and temperature, of the P-channel MOSFET 20a associated with the amount of leakage current appearing therein with those of the P-channel MOSFET 22a associated with the amount of leakage current appearing therein.

This allows an amount of leakage current flowing through the P-channel MOSFET 20a of the first CMOS switch 20C to be substantially identical to that of leakage current flowing through the P-channel MOSFET 22a of the second CMOS switch 22C.

Similarly, the N-channel MOSFETs 20b and 22b of the respective first and second CMOS switches 20C and 22C are formed in the common island 301B surrounded by the trench isolations 302. This can substantially match physical characteristics, such as electric potential and temperature, of the N-channel MOSFET 20b associated with the amount of leakage current appearing therein with those of the N-channel MOSFET 22b associated with the amount of leakage current appearing therein.

This allows an amount of leakage current flowing through the N-channel MOSFET 20b of the first CMOS switch 20C to be substantially identical to that of leakage current flowing through the N-channel MOSFET 22b of the second CMOS switch 22C.

As set forth above, the physical characteristics of the first CMOS switch 20C associated with the amount of leakage current appearing therein are substantially identical to those of the second CMOS switch 22C associated with the amount of leakage current appearing therein. This makes it possible to reduce the impact of the differences between the physical characteristics of the first CMOS switch 20C and those of the second CMOS switch 22C on the ripple-voltage filtering characteristics of the smoothing circuit 104B.

In the embodiment and its specific examples, the first and second capacitors 16 and 18 are electrically connected between the negative input terminal and the output terminal of the differential amplifier 10 in parallel to each other. The present invention is not limited to the structure.

Specifically, three or more capacitors can be electrically connected between the negative input terminal and the output terminal of the differential amplifier 10 in parallel to each other. A pair of switches 20 and 22 can be electrically connected with both electrodes of each of the three or more capacitors. In the configuration of the modification, simultaneous on and off switchings of at least one pair of switches 20 and 22 electrically connected with both electrodes of one of the three or more capacitors can effectively eliminate ripple voltages from the output voltage (monitor voltage Vm) of the alternator 1 even if frequencies (cycles) of the ripple voltages are changed with the change in the RPM of the alternator 1.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A system for smoothing an output voltage of a power generator, the output voltage containing frequency components, the system comprising:
    a filter circuit to which the output voltage is input, the filter circuit comprising:
        a semiconductor substrate having an island portion therein;
        a first capacitor having opposing first and second electrodes;
        a second capacitor having opposing third and fourth electrodes;
        a first semiconductor switch electrically connected to be series with the third electrode of the second capacitor; and
        a second semiconductor switch electrically connected to be series with the fourth electrode of the second capacitor, the series-connected first switch, the second capacitor, and the second semiconductor switch constitute a series circuit, the series circuit being electrically connected with the first capacitor in parallel thereto, each of the first and second semiconductor switches being formed in the island portion of the semiconductor substrate, wherein the first semiconductor switch and the second semiconductor switch are configured to have substantially the same amount of leakage current flow during the first and second semiconductor switches being off; and
    a control circuit electrically connected to the first and second semiconductor switches of the filter circuit and configured to control the first and second semiconductor switches to be substantially simultaneously on and off to thereby cause the filter circuit to filter out the frequency components from the output voltage.

2. A system according to claim 1, wherein the filter circuit comprising:
    a differential amplifier having a negative input terminal, a positive input terminal, and an output terminal;
    a first resistor electrically connected between the negative input terminal of the differential amplifier and an input terminal of the filter circuit;
    a second resistor electrically connected between the negative input terminal and the output terminal of the differential amplifier, the first capacitor and the series circuit being electrically connected between the negative input terminal and the output terminal of the differential amplifier in parallel to the second resistor.

3. A system according to claim 1, wherein each of the first and second semiconductor switches is constituted by a MOSFET.

4. A system according to claim 1, wherein the first and second semiconductor switches are constituted by first and second CMOS switches, respectively, each of the first and second CMOS switches comprising an N-channel MOSFET and a P-channel MOSFET whose source and drain are commonly connected to source and drain of the N-channel MOSFET.

5. A system according to claim 4, wherein the island portion includes a first island and a second island, the N-channel MOSFET of the first CMOS switch and the N-channel MOSFET of the second CMOS switch are formed in the first island isolatedly partitioned in the semiconductor substrate, and the P-channel MOSFET of the first CMOS switch and the P-channel MOSFET of the second CMOS switch are formed in the second island isolatedly partitioned in the semiconductor substrate.

6. A system according to claim 1, wherein the power generator comprises a rotor and works to generate the output voltage based on rotation of the rotor, the control circuit comprises:
    a revolution detector configured to detect the number of revolutions of the rotor of the power generator; and
    a unit operatively connected to the revolution detector and configured to:
    control the first and second semiconductor switches to be substantially simultaneously on and off based on the detected number of revolutions of the rotor of the power generator.

7. A system according to claim 6, wherein the unit is configured to:
    switch the first and second semiconductor switches from being off to being on when the detected number of revolutions of the rotor of the power generator is equal to or higher than a predetermined number of revolutions.

\* \* \* \* \*